June 6, 1967  E. J. CAVANAUGH  3,323,295
POWER LAWN MOWERS

Filed Dec. 28, 1964  3 Sheets-Sheet 1

EDWIN J. CAVANAUGH
INVENTOR.

BY *Earl E. Moore*
ATTY.

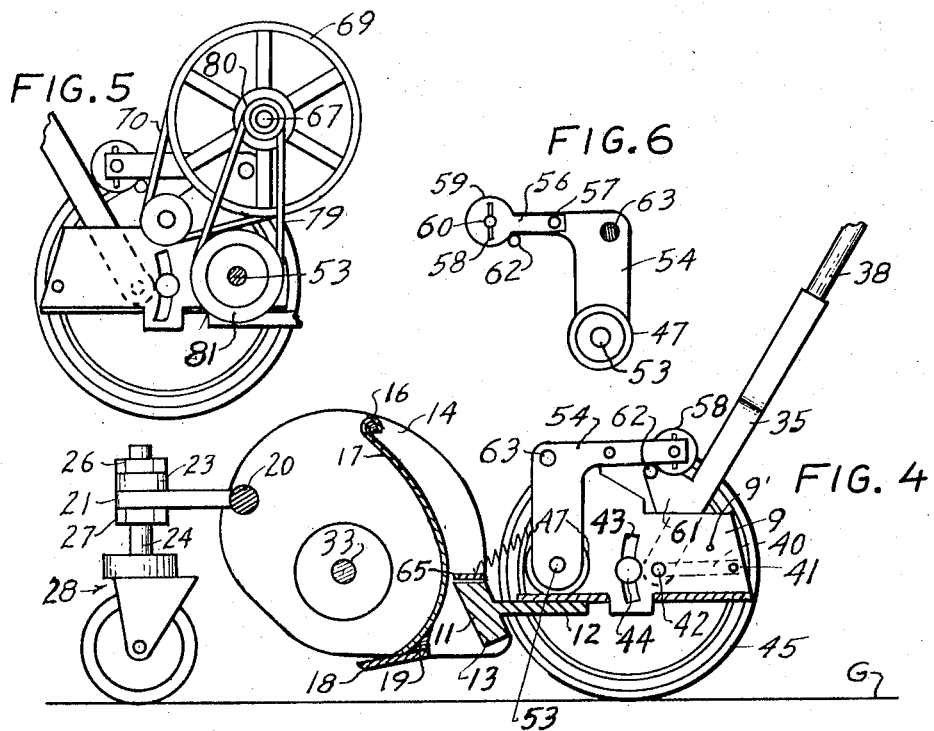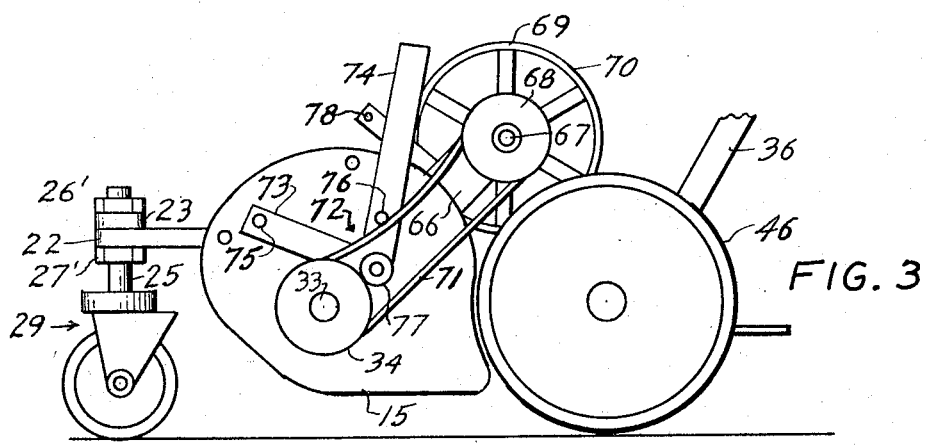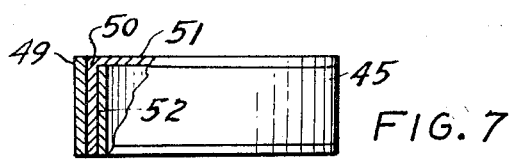

June 6, 1967   E. J. CAVANAUGH   3,323,295
POWER LAWN MOWERS

Filed Dec. 28, 1964   3 Sheets-Sheet 3

EDWIN J. CAVANAUGH
INVENTOR.

BY *Earl E Moore*
ATTY.

United States Patent Office 3,323,295
Patented June 6, 1967

3,323,295
POWER LAWN MOWERS
Edwin J. Cavanaugh, Fontana, Calif. (Grand View Trailer Court, 351 E. 7th St., Box 11, San Jacinto, Calif. 92383)
Filed Dec. 28, 1964, Ser. No. 421,486
4 Claims. (Cl. 56—26)

ABSTRACT OF THE DISCLOSURE

The invention concerns a self-powered lawn mower wherein vertical movement of the handle controls the start and stop of the mower's transit. The wheels have inner tracks along which work power rollers and these rollers serve as brakes as well as driving means for the wheels.

This invention relates to power lawn mowers and the like for cutting vegetation such as grass and other ground covers. The mower is so arranged and designed that it can work at maximum efficiency and can be easily operated by anyone including a child. The control means for the cutter blades is manipulated separately and is independent of the control means for transit of the mower. The transit operation of the mower is controlled entirely by the raising and lowering of the stick or handle means which is employed to guide the mower in desirable directions along the ground surfaces being trimmed.

Also, in combination with the lawn mower, there is a means for driving the ground wheels of the mower from either side of the flanged wheels thereof. One of the means provides a resilient driving roller within the ground wheel itself so as to be protected from damage and unnecessary wear and tear; and another means which provides a resilient driving roller along the outer periphery of the ground wheels so that the invention can be more readily applied to the well known push-pull spiral cutter lawn mower.

It should be understood, however, that the principles of this invention is appliable to any kind or type of mower whether of the smaller hand variety or the much larger machines for field use.

One of the principal objects of this invention is to provide a power driven lawn mower and the like wherein the cutter blades and the transit ground wheels are individually controlled and in a manner that is economical to make and to manufacture.

Another object is to provide power means for a lawn mower and the like wherein the driving force for the ground wheels is either inside the wheels or along the outer periphery of the wheels.

Still another object is to provide a lawn mower or ground cover cutter that is constructed for efficient work operations and yet designed in simple form for easy care and maintenance, and in combination with means for raising and lowering the cutter bar thereof with respect to ground level.

In order to clearly show one or more forms of this invention, the following description in association with the illustrations hereof are made in order to disclose various details.

In the drawings:

FIG. 3 is a side elevational view;

FIG. 4 is a view taken substantially along the line 4—4 of FIG. 2;

FIG. 5 is a view taken substantially along line 5—5 of FIG. 1;

FIG. 6 is an elevational view, partly in section, showing a detailed portion of the mower;

FIG. 7 is a plan view of one of the ground wheels with a portion broken away;

Figure 1:
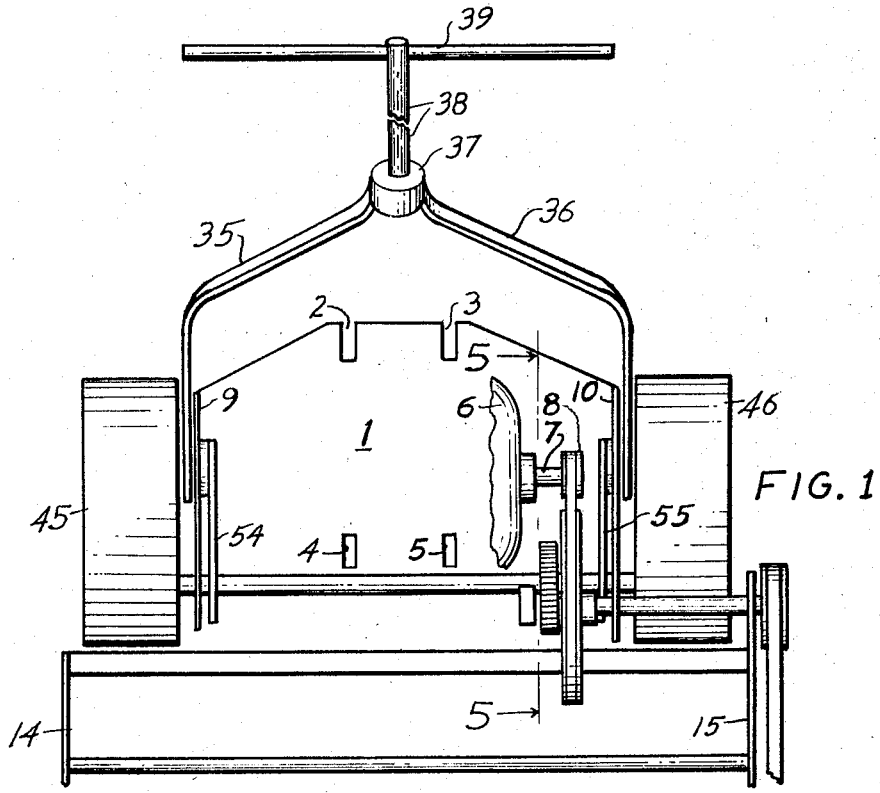
FIG. 1 is a partial plan view of a grass cutter or mower with portion broken away.
Figure 2:
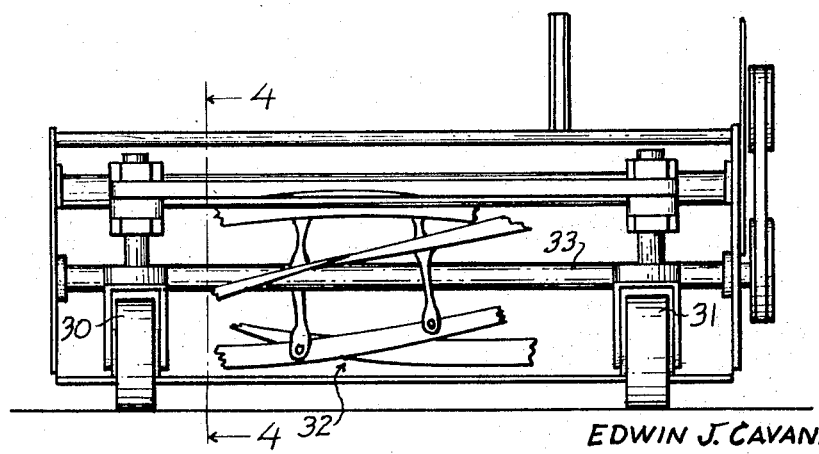
FIG. 2 is a front elevational view without showing the guiding handle portion of the mower.

The particular mower shown in FIGS. 1 to 7 inclusive, has a pan or deck means 1 provided with the openings 2, 3, 4 and 5 to accommodate the fastening means for a power unit 6 and which unit is shown in position but with most of it broken away. The power unit may be of any suitable kind or type for a ground cover cutter or lawn mower. The power unit may be an electric motor, a gas internal combustion engine, or even a steam engine where the mower is a great size for field work. A power shaft 7 extends from the engine or power unit and is provided with a keyed pulley wheel 8. The side edges of the deck means are turned upwardly as indicated at 9 and 10. These side edges may be termed supporting flanges in that they support various parts of the mower device.

For a rigid cross support the structural element or bar 11 is provided, note FIG. 4, and this bar is provided with an integral rearwardly extending flange or plate 12 which is welded or otherwise securely fixed to the bottom of the deck means 1. The forward portion of the bar has an inclined heavier section 13 which extends between and gives firm support of the side wings or walls 14 and 15 and which are securely fixed to the ends of the bar by suitable means which may be by welding, brazing, bolts, etc. The parts mentioned, deck, flanges, wings etc. form a frame to accommodate various moving parts, etc.

The wings are provided with a spacer bar 16 having its ends fixed to the wings and also to a curving shield or plate means 17 which extends to a shearing blade or cutter bar 18; and this bar is secured to an angled cross bar 19 which has its ends secured to the wings 14 and 15, as shown. The forward ends of the wings are fixed to a cross bar 20 from which extend the spaced apart cantilever-like stub bars 21 and 22, employed to support casters. Another cross bar 23 gives added strength to the mentioned stub bars, but may be omitted if desired. The end portions of the stub bars and the end portions of the cross bar have bores to accommodate their respective shafts 24 and 25 and which shafts are threaded to receive the nuts 26, 27 and 26′ and 27′ for securing all parts firmly together for a complete structural job.

The shafts 24 and 25 are connected to their respective wheel trunnions 28 and 29 which have wheels or roller means 30 and 31 connected therewith so as to give the mower forward support and rolling means. These rollers may be termed casters. Between the wings or walls 14 and 15 there is installed a typical reel grass cutting means indicated in general by the reference character 32. Such a means has the usual spiral-like cutting blades and a shaft 33 upon which they are secured for their rotary action. This shaft extends through wing 15 and is provided with a keyed pulley 34.

A handle, stick, or guide control means is connected to the mower and consists of a pair of spaced apart curved bars 35 and 36 which have their top ends joined to a suitable union means 37 and which means has a threaded bore that receives the lower end of a handle shaft 38. The top end of this shaft has a bore into which is fixed a cross grip type of bar 39. The lower ends of the curved offset bars 35 and 36 are pivotly joined to their respective deck flanges 9 and 10, as shown.

Now, note FIG. 4 of the drawings in which is illustrated how the cutter bar is adjusted as to cutting height above ground. A swing bar 40 has one end pivoted at 41 to its respective side flange. In each flange 9 (or 10) there is a curved slot 43 in which rides an end 44 of the axle of the wheel 45 (or 46). Bolt means and nuts with washers are provided on the axle end 44 so that the axle can be tightened when adjusted, a well known custom in the art. This arrangement allows the blades to be adjusted as to height from the surface which is being trimmed and it does so without changing the position of the drive rollers 47 (or 48) in a manner to be explained later.

Each ground wheel 45 and 46 has an outer covering 49 of suitable tread material which may be rubber or some other kind of resilient material to keep down noise. The wheels are of the flanged type having the rim 50 and the disc-like integral outer side wall 51 thus leaving the other side, inner side, of each ground wheel open. Within the flange portion of each wheel there is a resilient material indicated at 52 which is a friction liner and of such suitable material, such as rubber for instance, to make good frictional contact with its respective roller 47 or 48. Obviously, the disc-like wall 51 has a central opening to accommodate its axle through a suitable lubricated bearing.

The two power delivery rollers 47 and 48 are keyed to a common cross power delivery shaft 53 which has bearing in the two spaced apart bell cranks or crank arms 54 and 55. Each crank has one arm portion which provides bearing for its respective end of the shaft 53 and another arm that supports an adjustable cam means 56. This cam means has a bar portion that has its end pivoted at 57 and the other end thereof provided with a disc-like cam 58. The cam has a slot 59 along which rides a pin 60 that is fixed to the end portion of the horizontal arm of the crank. The pin is provided with means, such as a tightening bolt with nuts and washers, so that when the cam is once adjusted, it can be held in adjusted position.

Each handle portion 35 and 36 is provided with an integral projection 61 to which is fixed a roller or pin 62 designed to ride along the lower curved edge of its respective cam 58. Each crank is pivoted at 63 to a suitable bearing means such as a pin which extends inwardly from a high portion of its respective deck flange or wall 9 or 10. By this arrangement, the power rollers 47 and 48 are retracted from contact with their respective wheel flange liners 52 when the handle 38 is pulled or pushed downwardly. The handle in its normal position is lower than shown in FIG. 4 so that the power rollers 47 and 48 are not in contact with the liners. Any suitable stop pin may be provided on one of the side flange walls 9 or 10, or on both walls, such as indicated at 9' for instance. When it is desired to transmit power to the ground wheels 46 and 45, it is only necessary to raise the handle 38 (the position shown in FIG. 4) and this releases the cranks 54 and 55 under the pull of the coiled springs 64 so that the rollers make good power transmitting contact with the liners 52 of the ground wheels and thus causes forward motion of the mower. Each crank has attached thereto one or more such springs like 64. The other ends of the springs 64 are fixed to a cross bar 65 that is fixed to but slightly spaced from the cross support element 11.

A short bracket means 66 is firmly fixed to the wing 15, as by welding or brazing etc., and this bracket means extends rearwardly to provide a bearing arm for a shaft 67 which supports a small pulley wheel 68, note in particular FIG. 3. At the other end of this shaft a portion of the deck flange 10 provides a bearing for this shaft and keyed to this shaft is a large pulley wheel 69. A V-type belt 70 connects this large pulley wheel with the smaller pulley wheel 8 of the power unit 6. A V-type belt 71 connects pulley wheel 68 with the pulley wheel 34 to provide power to the shaft 33 which contains the rotary cutter blades of the mower. The power of the belt 71 is under control of the crank means 72 which has a short arm 73 and a long arm 74. Arm 74 is the handle, or for better convenience an operator's foot control arm or treadle. The short arm of the crank is pivoted to the wing 15 by a pin means 75, and the long arm has a rider roller 76 journalled thereto that is operative to tighten or loosen the belt 71 so as to provide power to pulley 34 or not as desired. The lower end of this crank has a roller 77 to engage the pulley 34 as a stop for its downward limit of movement. A stop pin 78 on the end of a bar that is fixed to the bracket 66 provides an upper limit of movement of the crank arm 74, as shown.

Power from shaft 67 is delivered to shaft 53 by means of a chain 79 which is linked to a small sprocket wheel 80 keyed to shaft 67 and a larger sprocket wheel keyed to the shaft 53 as shown in FIG. 5. By the use of belts and chains, power is delivered to the various rotary parts so that when the operator desires, either the ground wheels or the rotary cutter can be energized, or both energized. Because of the provision of the curved slots 43, note FIG. 4, the rollers 47 and 48 can make good contact with their respective ground wheel liners regardless of the adjustment of the ground wheels with respect to the ground surface G. In other words, the rollers are not shifted from proper position for making good reliable linked driving force with the ground wheels.

Figure 8:
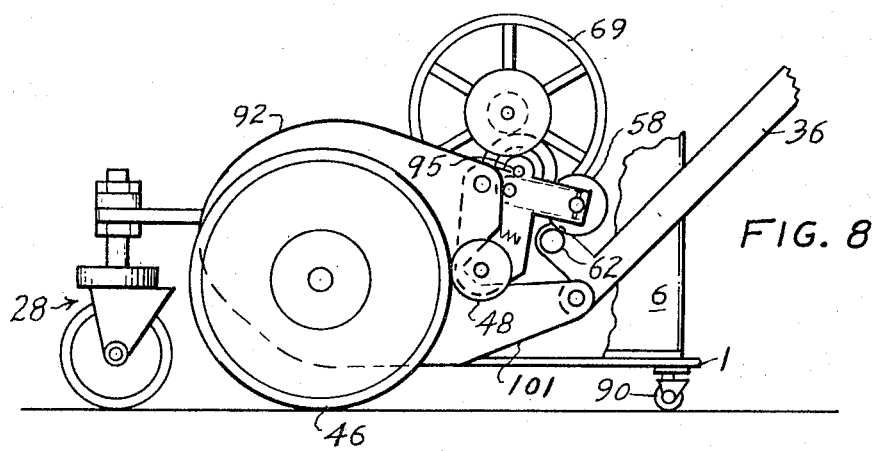
FIG. 8 is a side elevational view showing a modified form of the invention.
Figure 9:
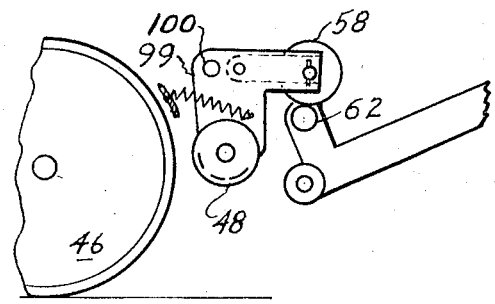
FIG. 9 is an elevational view of certain parts.
Figure 10:
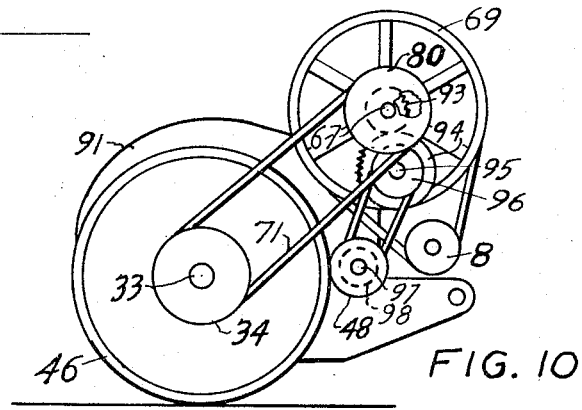
FIG. 10 is an elevational view with certain parts removed for the sake of clarity.

The second form of the invention shown in FIGS. 8, 9 and 10 is the same as the first form just explained except that the ground wheels are keyed to the shaft that accommodates the cutting blades. The mechanism of this second form of mower is arranged to drive the ground wheels by the same kind of drive rollers except that the rollers make contact with the outer rim of the ground wheels instead of the inner surface thereof. For the sake of simplicity, the same parts in this modified form which are in agreement with the parts of the first described form are given the same reference characters. For the sake of clarity, only the essential parts are shown in the second form of the invention as illustrated.

The pan or deck 1 in this second form, however, is provided with a caster 90 and this gives sufficient support to the mower in combination with the ground wheels 45 and 46; therefore, the forward swivel ground wheels 28 and 29 can be dispensed with as surplus parts if desired. Note, that the large pulley wheel 69, as in the first form of the invention, is driven by the smaller pulley wheel 8 of the power unit 6 and that a pulley wheel 68 keyed to the shaft 67 drives the pulley wheel 34 which roates the cutter blade shaft. Obviously, sproket wheels and chains may be substituted for any of the pulley wheels and belts disclosed in the drawings, if better operation is attained.

In this second form, the end walls or upstanding flanged-like wings are configured differently from the ones shown at 9 and 10 in the first form. In this second form, these wings are duplicates and configured to accommodate new positions of the changed parts; and hence are given the numerals 91 and 92. The shaft 67 is provided with a gear 93 which is in mesh with a gear 94 fixed to a jack shaft 95 and a pulley wheel 96 on this same shaft is connected to a pulley wheel 98 which is keyed to the shaft 97 that rotates the spaced pair of driving rollers 47 and 48.

The shaft 97 drives the rollers and each driving roller 47 and 48 is shiftable by its respective one of the pair of cranks which work in unison; each one of these cranks is indicated by numeral 99. The shaft 100, like 53 in the first form, supports the cranks pivotly so that the rollers can be shifted into the positions indicated in FIGS. 8 and 9. The shifting is accomplished by the cooperation of the cam 58 and the pin 62 as set out in the description of the first form. Each wing 91 and 92 is provided with an extended portion 101 to provide a proper bearing for the bottom ends of the mower guiding hand means 36.

It should now be clear tha the principle of operation and control for the second form of the invention is the same as for the first form; the main differences being that the driving roller in the second form is operative on the outer rim of the ground wheels whereas in the first form the contact is made on the inner surface of the flange. Also, the ground wheels have been shifted to the rotary blade shaft so that the invention can be employed on typical hand operated push-pull grass cutters or mowers.

Certain novel features and details of this invention are disclosed herein, and in some cases in considerable detail, in order to make the invention clear in at least one or more forms thereof. However, it is to be clearly understood that the invention, as disclosed, is not necessarily limited to the exact form or forms and details disclosed since it is apparent that various modificaitons and changes may be made without departing from the spirit and scope of the invention.

Having thus described my invention, what is claimed as new and desired to be secured by Letters Patent is:

1. A surfacing device having a reel cutter-like means, a frame having spaced apart upstanding end flanges with a deck therebetween and also spaced apart side wings forwardly of the said deck, ground wheels connected to and supporting the frame, a guiding handle means pivoted to portions of the frame, a power unit fixed in position on the deck of said frame, the ground wheels each having an interior track, a shiftable driving means having connection with said track, transmitting means connecting the power unit with the shiftable driving means for rotating the ground wheels, a crank means having cam means connecting a portion of the handle guiding means with said shiftable driving means so that when the handle guiding means is in a low position the shiftable driving means is out of contact with said track, but when the handle guiding means is in a relatively high position the driving means is in contact with said track, a curved slot in each upstanding end flange, axle means for each ground wheel, each axle extending through its respective curved slot, means for firmly fixing each axle in its respective slot so that the height of the axles above a ground surface can be varied without interfering with the shiftable driving means in its proper adjustment.

2. A mower device having a pivoted handle and rotary cutter means supported on a frame means, ground wheel means supporting the frame means, a power unit fixed to the frame means, the ground wheel means having flanged portions providing endless tracks within the wheel means and wherein the outer surface of the wheel means makes rotary contact with a ground surface to be trimmed, a first means connecting power to the rotary cutter means for operating it, and a second means connecting the power unit with the ground wheel means for its rotation and hence for transit of the mower along a ground surface, the second means including friction rollers which are in and out of contact with said tracks, operable means for shifting the friction rollers, the operable means comprising a pair of spaced apart spring controlled cranks pivoted to the frame means, one end of each crank having pivoted thereto one of the friction rollers and the other end provided with a cam means, the handle having a pair of bars with pivoted portions near to their respective cam means, a rider means extending from each bar near the pivots thereof and which rider means operate to shift the cam means and hence the friction rollers when the handle is vertically shifted.

3. The mower device recited in claim 2 wherein the friction rollers are normally held in contact with said tracks by said springs to act as a brake when not used to drive the wheel means.

4. The mower device recited in claim 2 wherein the wheel means includes a pair of wheels, each wheel having its flange about a disc-like side wall, said track of each wheel comprising a resilient liner on the inner surface of the flange for making good frictional contact with its respective roller.

References Cited

UNITED STATES PATENTS

| | | | |
|---|---|---|---|
| 1,511,040 | 10/1924 | Ramsey | 56—26 |
| 2,623,603 | 12/1952 | Cutlan et al. | |
| 2,705,859 | 4/1955 | Burg | 56—26 |
| 2,886,934 | 5/1959 | Jepson | 56—26 |
| 3,035,385 | 5/1962 | Jepson et al. | 56—26 |
| 3,035,386 | 5/1962 | Lill | 56—26 |

ABRAHAM G. STONE, *Primary Examiner.*

ANTONIO F. GUIDA, *Examiner.*